US012275404B2

(12) United States Patent
George et al.

(10) Patent No.: US 12,275,404 B2
(45) Date of Patent: Apr. 15, 2025

(54) BEHAVIORS THAT REDUCE DEMAND ON AUTONOMOUS FOLLOWER VEHICLES

(71) Applicant: Stack AV Co., Mount Pleasant, PA (US)

(72) Inventors: Michael David George, Pittsburgh, PA (US); Tekin Alp Meriçli, Pittsburgh, PA (US); Cetin Alp Meriçli, Pittsburgh, PA (US); Venkataramanan David Rajagopalan, Sewickley, PA (US); Alonzo James Kelly, Edgeworth, PA (US)

(73) Assignee: Stack AV Co., Mount Pleasant, PA (US)

( * ) Notice: Subject to any disclaimer, the term of this patent is extended or adjusted under 35 U.S.C. 154(b) by 0 days.

(21) Appl. No.: 17/071,105

(22) Filed: Oct. 15, 2020

(65) Prior Publication Data
US 2021/0129843 A1 May 6, 2021

Related U.S. Application Data

(60) Provisional application No. 62/915,795, filed on Oct. 16, 2019, provisional application No. 62/915,808, filed on Oct. 16, 2019.

(51) Int. Cl.
B60W 30/165 (2020.01)
B60W 30/12 (2020.01)
B60W 30/18 (2012.01)

(52) U.S. Cl.
CPC ......... *B60W 30/165* (2013.01); *B60W 30/12* (2013.01); *B60W 30/18163* (2013.01);
(Continued)

(58) Field of Classification Search
CPC ............... B60W 30/165; B60W 30/12; B60W 30/18163; B60W 2420/42;
(Continued)

(56) References Cited

U.S. PATENT DOCUMENTS 3,461,812 A 8/1969 Roland
7,124,027 B1 10/2006 Ernst et al.
(Continued)

FOREIGN PATENT DOCUMENTS

EP 3614355 A1 2/2020
JP 2008-108219 A 5/2008
(Continued)

OTHER PUBLICATIONS

Chien et al., "Automatic Vehicle-Following", Southern California Center for Advanced Transportation Technologies, pp. 1748-1752 (1992).
(Continued)

*Primary Examiner* — Peter D Nolan
(74) *Attorney, Agent, or Firm* — Morrison & Foerster LLP

(57) ABSTRACT

Methods and apparatus that reduce demands on behavior of autonomous vehicles operating in a convoy, such as lane following or leader swap. A follower vehicle receives information regarding a path that a leader vehicle has followed. The follower generally follows the leader's path while being free to also observe its own lateral or lane constraints. In particular, lateral control of the follower, that is control of its relative location transverse to the road (e.g., its position relative to travel lanes) may deviate temporarily from the leader's path. This can make it easier for the follower to observe lane discipline, such as by eliminating the tendency, using line-of-sight distance, for the follower to speed up and close a gap to the leader while negotiating a curve.

30 Claims, 11 Drawing Sheets

(52) U.S. Cl.
CPC ... *B60W 2420/403* (2013.01); *B60W 2552/53* (2020.02); *B60W 2554/4041* (2020.02); *B60W 2554/4048* (2020.02); *B60W 2554/801* (2020.02); *B60W 2554/802* (2020.02)

(58) Field of Classification Search
CPC ..... B60W 2552/53; B60W 2554/4041; B60W 2554/4048; B60W 2554/801; B60W 2554/802; G08G 1/22
See application file for complete search history.

(56) References Cited

U.S. PATENT DOCUMENTS

| | | | |
|---|---|---|---|
| 8,116,921 | B2 | 2/2012 | Ferrin et al. |
| 8,352,111 | B2 | 1/2013 | Mudalige |
| 10,427,732 | B1 | 10/2019 | Carroll |
| 10,593,211 | B2 | 3/2020 | Kim |
| 11,541,889 | B2 * | 1/2023 | Um ........................ B60W 50/10 |
| 2009/0057068 | A1 * | 3/2009 | Lin ......................... B66B 1/468 187/392 |
| 2010/0256836 | A1 | 10/2010 | Mudalige |
| 2010/0256852 | A1 * | 10/2010 | Mudalige ............... G08G 1/164 701/24 |
| 2013/0041576 | A1 | 2/2013 | Switkes et al. |
| 2013/0080041 | A1 * | 3/2013 | Kumabe ................ G05D 1/024 701/117 |
| 2013/0151058 | A1 | 3/2013 | Zagorski et al. |
| 2013/0166157 | A1 | 6/2013 | Schleicher et al. |
| 2015/0239473 | A1 | 8/2015 | Gosset |
| 2015/0307095 | A1 | 10/2015 | Aso |
| 2016/0026187 | A1 | 1/2016 | Alam |
| 2016/0253906 | A1 | 9/2016 | Celikkol et al. |
| 2016/0318510 | A1 | 11/2016 | Hess |
| 2017/0011633 | A1 * | 1/2017 | Boegel ................. G05D 1/0293 |
| 2017/0147005 | A1 | 5/2017 | Ramm et al. |
| 2017/0259820 | A1 | 9/2017 | Takahashi |
| 2018/0050697 | A1 | 2/2018 | Kuszmaul et al. |
| 2018/0113448 | A1 | 4/2018 | Nagda |
| 2018/0188725 | A1 | 7/2018 | Cremona et al. |
| 2018/0188745 | A1 | 7/2018 | Pilkington |
| 2018/0188746 | A1 | 7/2018 | Lesher et al. |
| 2019/0054920 | A1 | 2/2019 | Karlsson et al. |
| 2019/0084533 | A1 | 3/2019 | Kasper et al. |
| 2019/0088142 | A1 | 3/2019 | Kotteri et al. |
| 2019/0147262 | A1 | 5/2019 | Kuehnle et al. |
| 2019/0147745 | A1 | 5/2019 | Kim |
| 2019/0179330 | A1 | 6/2019 | Oniwa |
| 2019/0180629 | A1 | 6/2019 | Kim |
| 2019/0196501 | A1 | 6/2019 | Lesher et al. |
| 2019/0204853 | A1 | 7/2019 | Miller, Jr. et al. |
| 2019/0206260 | A1 | 7/2019 | Pilkington et al. |
| 2019/0206261 | A1 | 7/2019 | Szymezak et al. |
| 2019/0206262 | A1 | 7/2019 | Sin |
| 2019/0225219 | A1 | 7/2019 | Ueda |
| 2019/0241184 | A1 | 8/2019 | Hayashi |
| 2019/0308625 | A1 | 10/2019 | Timura et al. |
| 2020/0033885 | A1 * | 1/2020 | Kim ..................... G05D 1/0291 |
| 2020/0042013 | A1 | 2/2020 | Kelkar et al. |
| 2020/0057453 | A1 | 2/2020 | Laws et al. |
| 2020/0107384 | A1 | 4/2020 | Lindner et al. |
| 2020/0241563 | A1 * | 7/2020 | Van Der Knaap .... B60W 30/12 |
| 2020/0282990 | A1 | 9/2020 | Sato |
| 2020/0283025 | A1 | 9/2020 | Honda |
| 2020/0284883 | A1 | 9/2020 | Ferreira et al. |
| 2020/0406834 | A1 | 12/2020 | Russell et al. |
| 2021/0034054 | A1 | 2/2021 | Patnaik et al. |
| 2021/0129844 | A1 | 5/2021 | George et al. |

FOREIGN PATENT DOCUMENTS

| | | |
|---|---|---|
| JP | 2015-210720 A | 11/2015 |
| JP | 2017-10586 A | 1/2017 |
| JP | 2017-56783 A | 3/2017 |
| JP | 2019-46034 A | 3/2019 |
| KR | 10-1102408 B1 | 1/2012 |
| SE | 201950565 A1 | 2/2020 |
| WO | 2007081345 A1 | 7/2007 |
| WO | 2015199789 A2 | 12/2015 |
| WO | 2016/038931 A1 | 3/2016 |
| WO | 2017196165 A1 | 11/2017 |
| WO | 2018/035145 A1 | 2/2018 |
| WO | WO-2018085107 A1 * | 5/2018 ............. G01S 13/66 |
| WO | 2018/215910 A1 | 11/2018 |
| WO | 2019/106788 A1 | 6/2019 |
| WO | 20190214828 A1 | 11/2019 |

OTHER PUBLICATIONS

Fernandes, P., "Multiplatooning Leaders Positioning and Cooperative Behavior Algorithms of Communicant Automated Vehicles for High Traffic Capacity", IEEE Transactions on Intelligent Transportation Systems, pp. 1171-1187 (2014).

Halle et al., "Collaborative Driving System Using Teamwork for Platoon Formations", D'epartement d'informatique et g'enie logiciel Universit'e Laval, pp. 1-12.

Herrera et al., "Lateral Control of Heavy Duty Vehicles in Platooning using Model Predicitve Control", Master's thesis EX-038, Chalmers University of Technology (2016).

Kavathekar et al., "Vehicle Platooning: a Brief Survey and Categorization", Proceedings of the ASME 2011 International Design Engineering Technical Conferences & Computers and Information in Engineering Conference, August 28-31, Washington, DC, US (2011).

Keßler et al., "Lane Change of Heavy-Duty Vehicle Platoons Without Lateral Position Information", IFAC Proceedings, vol. 40:10, pp. 455-462 (2007).

Kunze et al., "Efficient Organization of Truck Platoons by Means of Data Mining", ICINCO, 7th International Conference on Informatics in Control, Automation and Robotics, 70 pages (2010).

Soni et al., "Formation Control for a Fleet of Autonomous Ground Vehicles: a Survey', Robotics, 7:67, p. 1-25 (2018).

Tsugawa et al., "A Review of Truck Platooning Projects for Energy Savings", IEEE Transactions on Intelligent Vehicles, 1:1, pp. 68-77 (2016).

van de Hoef et al., "Coordinating Truck Platooning by Clustering Pairwise Fuel-Optimal Plans", Proceedings of the 2015 IEEE 18th International Conference on Intelligent Transportation Systems, pp. 408-415 (2015).

Vegamoor et al., "A Review of Automatic Vehicle Following Systems", J. Indian Inst. Sci., vol. 99:4, pp. 567-587 (2019).

Wang et al., "Model Predictive Control-Based Cooperative Lane Change Strategy For Improving Traffic Flow", Advances in Mechanical Engineering, vol. 8(2), pp. 1-17 (2016).

Alvarez et al., "Safe Platooning in Automated Highway Systems Part II: Velocity Tracking Controller", Vehicle System Dynamics, vol. 32, pp. 57-84 (1999).

Schlindler et al., "Dynamic and Flizible Platooning in Urban Areas", AAET, 17 pages (2018).

International Search Report and Written Opinion Dated Apr. 2, 2021 for Related PCT/US20/55695.

International Search Report and Written Opinion Dated Mar. 26, 2021 for Related PCT/US20/55681.

Campbell. (Sep. 2007). "Steering Control of an Autonomous Ground Vehicle with Application to the DARPA Urban Challenge," Thesis, Massachusetts Institute of Technology; pp. 1-193.

Coulter. (Jan. 1992). "Implementation of the Pure Pursuit Path Tracking Algorithm," The Robotics Institute, Carnegie Mellon University (CMU-RI-TR-92-01); 15 pages.

Dani et al. "Position-Based Visual Servo Control of Leader-Follower Formation Using Image-Based Relative Pose and Relative Velocity Estimation," American Control Conference, Jun. 10-12, 2009, St. Louis, Missouri; pp. 5271-5276.

Extended European Search Report dated Jul. 19, 2023, directed to EP Application No. 20876345.8; 10 pages.

George et al., Office Action dated Aug. 4, 2022, directed to U.S. Appl. No. 17/071,156; 25 pages.

(56) References Cited

OTHER PUBLICATIONS

George et al., Office Action dated Mar. 14, 2023, directed to U.S. Appl. No. 17/071,156; 31 pages.
George et al., Office Action dated Sep. 29, 2023, directed to U.S. Appl. No. 17/071,156; 30 pages.
Huang et al. (Mar. 2009). "Finding Multiple Lanes in Urban Road Networks with Vision and Lidar," Autonomous Robots, 26: 103-122.
Kelly. (2013). "Sensors for Perception," Chapter 8.3 in Mobile Robotics: Mathematics, Models, and Methods, Cambridge University Press, pp. 551-565.
Mathworks. "Pure Pursuit Controller," located at www.mathworks.com/help/robotics/ug/pure-pursuit-controller.html, visited on Dec. 6, 2023. (3 pages).
Stevens et al. (Feb. 1965). "Offtracking Calculation Charts for Trailer Combinations," SAE International Technical Paper 650721, located at https://doi.org/10.4271/650721; 19 pages.
Wikipedia. "Kanade-Lucas-Tomasi feature tracker," located at https://en.wikipedia.org/wiki/Kanade-Lucas-Tomasi_feature_tracker, visited on Dec. 7, 2023; 8 pages.
Partial Supplementary Search Report dated Feb. 22, 2024, directed to EP application No. 20877510.6; 17 pages.
Extended European Search Report dated Jul. 1, 2024, directed to European Patent Application No. 20877510.6; 18 pages.

* cited by examiner

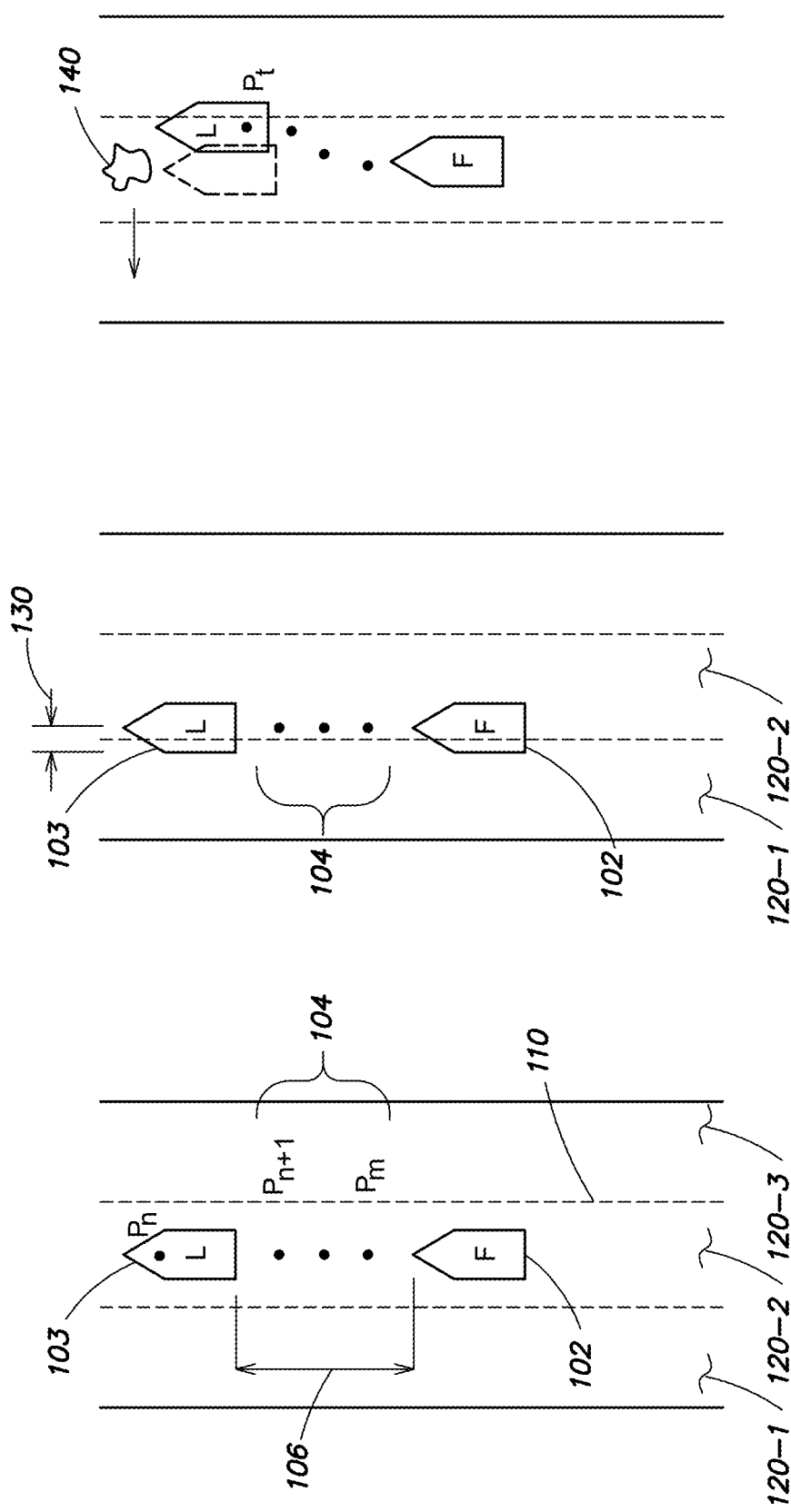

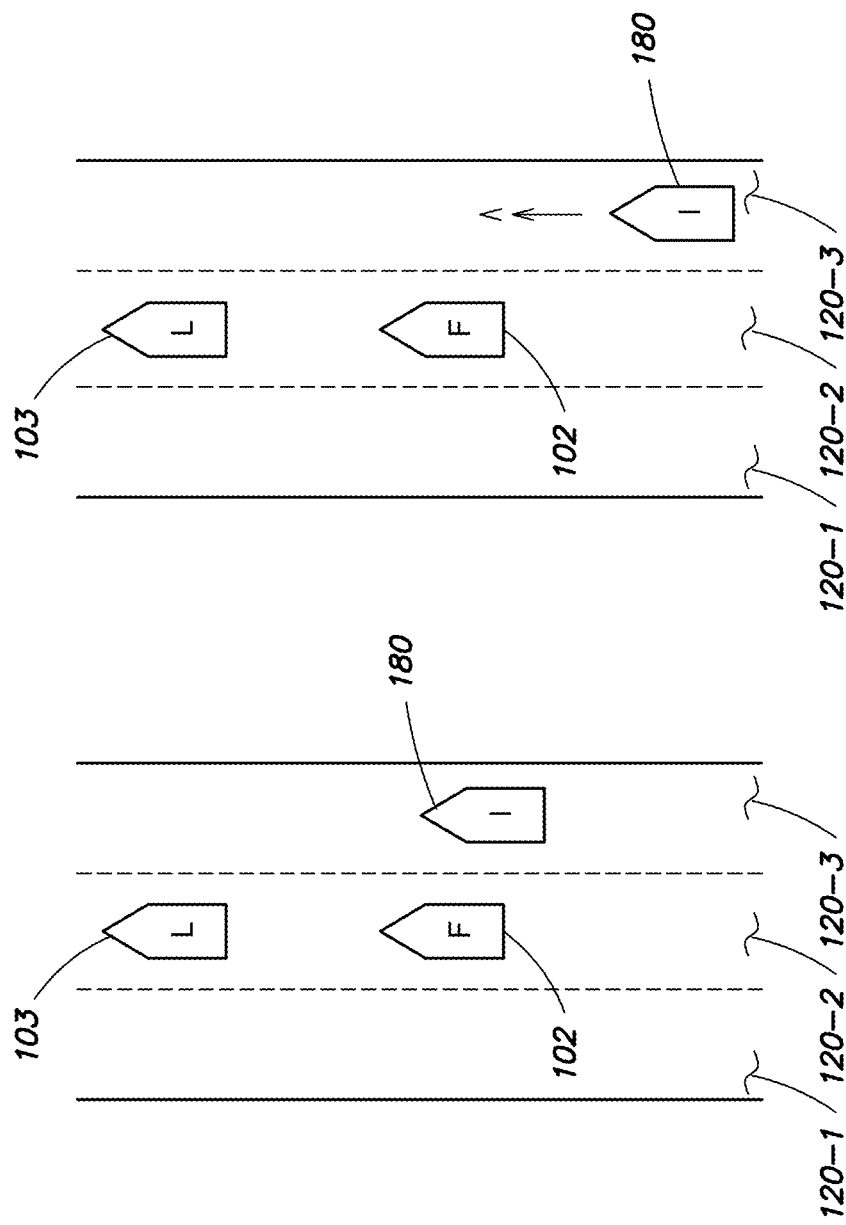

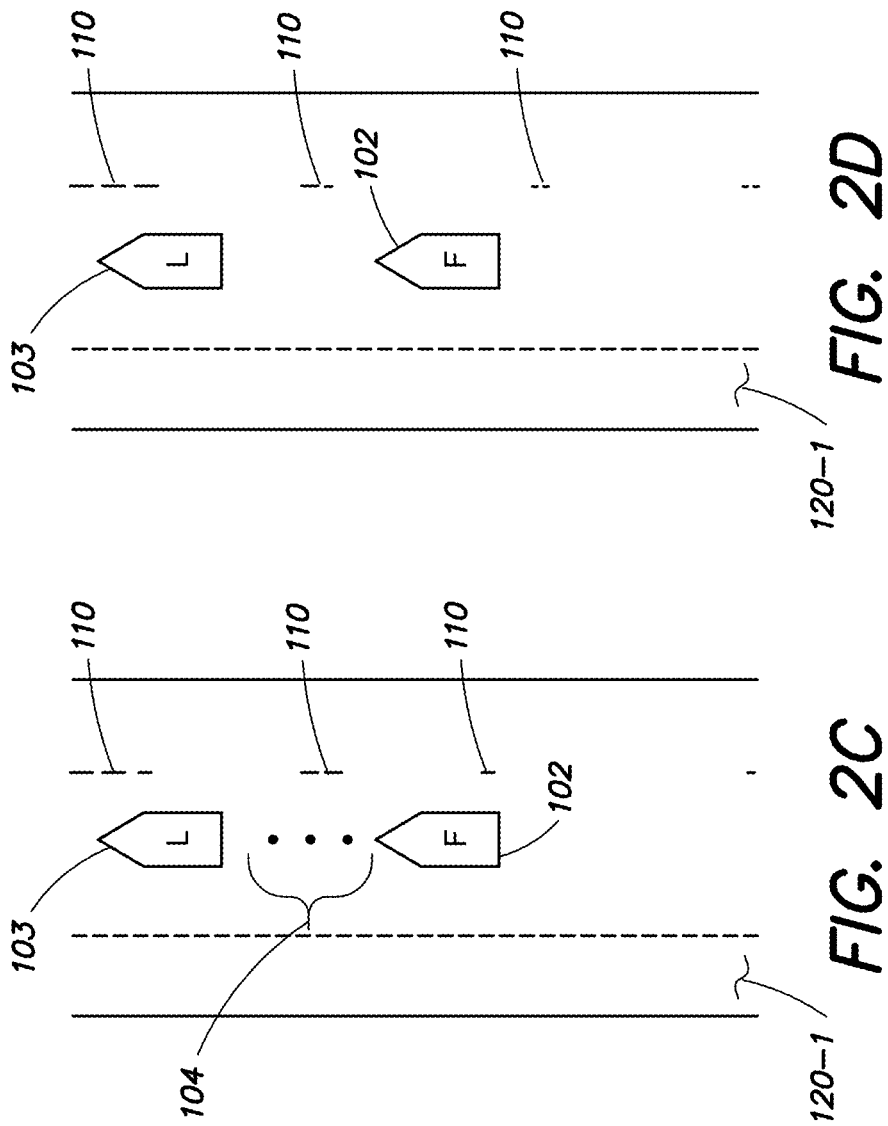

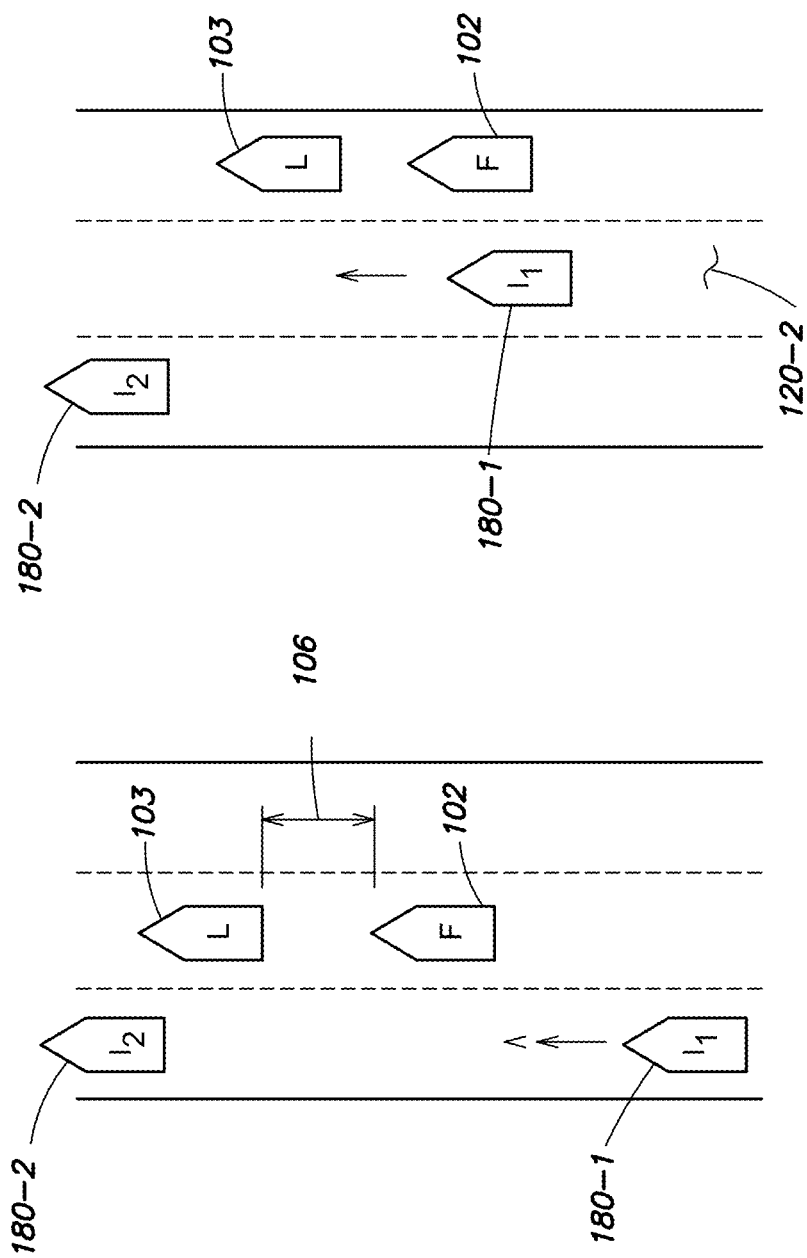

BEHAVIORS THAT REDUCE DEMAND ON AUTONOMOUS FOLLOWER VEHICLES

CROSS REFERENCE TO RELATED APPLICATION(S)

This patent application claims priority to a pending U.S. Provisional Application entitled "VISION-BASED FOLLOW THE LEADER LATERAL CONTROLLER" Ser. No. 62/915,795 filed on Oct. 16, 2019, and to co-pending U.S. Provisional Application No. entitled "REDUCING DEMAND ON AUTONOMOUS FOLLOWER VEHICLES" Ser. No. 62/915,808 filed on Oct. 16, 2019. This application is also related to a U.S. patent application entitled "VISION-BASED FOLLOW THE LEADER LATERAL CONTROLLER", Ser. No. 17/071,156, filed on Oct. 15, 2020. The entire contents of each of these applications are hereby incorporated by reference.

BACKGROUND

This patent application relates to methods and apparatus that reduce demands on autonomous vehicles operating in a convoy.

Researchers and vehicle manufacturers have been developing self-driving technologies for many years. Commercial trucking continues to be one of the areas where autonomous vehicles will eventually become widespread. In one scenario, the truck at the front of a convoy remains under human control, with one or more trailing vehicles autonomously following the leader, or each other. Sensors and/or wireless connections (such as vehicle-to-vehicle radio communication) keep the trucks aware of each other's position and condition, to enable the autonomous follower(s) to respond to changes in the leader's direction and speed.

Soni, et. al, in "Formation Control for a Fleet of Autonomous GroundVehicles: A Survey", Robotics, 2018, 7, 67 mentions various benefits of vehicle formation control such as improved safety, fuel efficiency, mileage, and time needed to travel and reduced road congestion. It is observed that autonomous vehicles must stay in the lanes and follow nearby vehicles by maintaining safe distance and velocity. The aim of the platoon formation control is to confirm that all vehicles in a platoon move at the same speed while maintaining a desired formation shape or geometry, which is stated by a desired inter-vehicle spacing strategy. Therefore, for autonomous vehicles, forming a platoon formation requires specific algorithms, controllers and strategies consisting of longitudinal and lateral control.

SUMMARY OF PREFERRED EMBODIMENTS

Of interest here are approaches that reduce demand on an autonomous follower, such as by simplifying their self-driving logic. These may include
- following the leader's path while observing lane marking constraints;
- staying directly behind the leader during a lane change or other maneuver;
- observing a defined leader handoff protocol; or
- other behaviors By adopting one or more of these approaches, the autonomous follower can thus be shown to operate more safely. One of these approaches or another may be selected based on current conditions.

In one embodiment, reducing demand on the follower may involve mimicking the lane offset behavior of the leader. In that case, the follower may detect positions of the leader along a path using its available sensor's vision such as lidars, radars, or camera. This can be done without total direct control of the follower by the leader (e.g., not complete control over lateral) or without communication of the positions of the leader to the follower such as over a wireless link. The follower strives to arrive at the same positions along the path—and staying within the same lane as the leader—but at the same time also further controls its own lateral position within that lane. The follower can control its position within the lane by detecting lane markings, or observing other indicia of the location of the travel lane such as road edges, jersey barriers, traffic cones, etc. As a result, the lane offset of the follower may often not be exactly the same as the lane offset of the leader.

However, in certain other conditions the follower operates differently. These conditions may happen when the follower detects (or is informed) that the leader is purposefully maneuvering a certain way, such as to deviate from its travel lane, to execute a lane change or to avoid an obstacle for example. In that case, the follower then ceases attempting to control its lateral position, and instead exactly positions itself directly behind the leader and follows exactly the same path—including its lateral position so that it is now "mimicking" the lane center offset of the leader. This mimicry such that the follower tries to exactly match the lane offset of the leader continues until the follower detects (or is informed) that the purposeful maneuver is complete.

Other implementations may refine this lane mimicry process. For example, the follower may use a detectable spot located somewhere on the leader vehicle as a reference point. The reference point is then used as a guide when determining the leader's lane offset. In one approach, when the follower reaches a given longitudinal position, it ensures that a corresponding reference point of its own ends up in the same lateral position as that of the corresponding reference point of the leader when the leader was at that given longitudinal position). Thus the follower might ensure that the location of the rear doors of the trailer (or of the rear axle of the tractor, etc.) are tracking the corresponding rear doors or (rear tractor axle, etc.) of the leader.

In other embodiments, reduced demand on the follower is possible during a leader swap maneuver. Here there are at least three vehicles, including a first leader (L1), a follower (F), and a second leader (L2). Initially, the follower is following the leader along some path. In some embodiments, the path may be derived by the follower using its own sensors to detect a series of positions of the leader, and without being directly informed by the leader such as over a wireless link. At some later time, the follower is enabled to follow the second leader by first testing for preconditions. If those conditions are not satisfied, the follower may veto the lane change maneuver. However, if the conditions indicate a safe lane change is possible, the follower can switch to following the second leader in a way such that the follower is never alone in a travel lane without having either the first or second leader to track using its sensors.

Advantages of the system described herein are that . . . .

BRIEF DESCRIPTION OF THE DRAWINGS

Additional novel features and advantages of the approaches discussed herein are evident from the text that follows and the accompanying drawings, where:

FIGS. 1A to 1C illustrate various states of lane following along a straight path.

FIGS. 2A to 2B illustrate an interfering vehicle.

FIG. 2C to 2D illustrate obscured lane markings.

FIG. 2E to 2F illustrate another interfering vehicle situation.

DETAILED DESCRIPTION OF ILLUSTRATIVE EMBODIMENT(S)

Figure 1D:
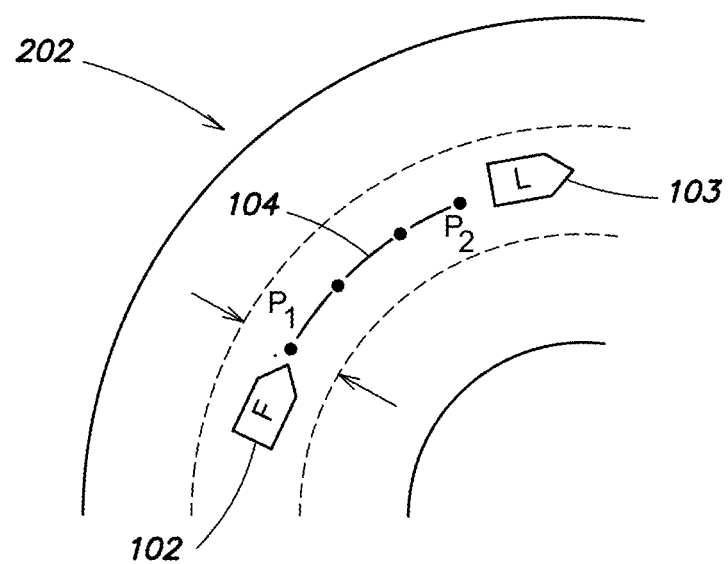
FIGS. 1D 1E illustrate various states of lane following along a curved path.

Turning attention to FIG. 1A, in one example situation a follower vehicle 102 (also designated with the letter "F") is following the same path 104 along the ground as a leader vehicle 103 (also designated with the letter "L"), while at the same time observing lane constraints.

The leader 103 and follower 102 can each be a vehicle such as a semi-truck that includes a tractor and a fifth wheel on which the kingpin of a trailer is coupled. In some implementations, a truck can be following a car, or vice versa, or a car may be following a car. Electronics located in the tractor and/or trailer of either or both vehicles include one or more sensors, communications interfaces, autonomous controllers, and interfaces to a physical drive system.

As will be explained in more detail in connection with FIG. 4, the sensors may include vision sensors such as cameras, radars, sonars, LIDARs, motion sensors such as odometers, speedometers, gyroscopes, and other sensors. In a case where the follower 102 is a semi-truck, at least some of the vision sensors should have fields of view that include region(s) in front of the semi-truck, other vision sensors may have fields of view that include side regions extending laterally from each side of the tractor or of any attached trailer, and still other vision sensors may point downward to view lane markings 110 or other indications of the lateral extent of a road surface and/or the region that constitutes the intended lane of travel. Electronics in the follower 102 may also include one or more computers that process data received from the sensors, use perception logic to determine one or more conditions, and then execute autonomous planner logic depending on those conditions. The planner logic in turn drives control logic that operates the mechanical components of the drive system. The drive system includes at least acceleration (or throttle), braking, and steering mechanisms that respond to electrical control inputs provided by the control logic. The control logic may directly use motion sensors such as odometers and gyroscopes to measure the motion of the vehicle.

1. Follower Follows the Leader's Path While Being Free to Also Observe its Own Lane Constraints Continuing to refer to FIG. 1A, the follower 102 (F) receives information regarding the path 104 that the leader 103 (L) has followed along the ground (either from the leader or by deriving it locally), and the follower (F) remains on that path at all times. The 104 path may be defined by a series of positions Pn, Pn+1, . . . , Pm or in other ways. Lateral control of the follower 102, that is control of its relative location transverse to the road (e.g., its position relative to the lanes 110-1, 110-2, 110-3 (collectively, lanes 110)), is also constrained such as by lane markings 110.

It should also be understood that lateral control is not the same as controlling the spacing or physical gap 106 between the leader L and follower F (for example, what an automatic cruise control might do, often referred to as longitudinal control). Vehicle convoys often impose a gap constraint, or a minimum distance 106 between leader 103 and follower 102. Here the gap constraint may be defined appropriately during turns to permit the follower 102 to remain in the same lane that the leader 103 had traversed, but at a shorter line-of-sight distance from the leader 103 at least temporarily. This can make it easier for the follower 102 to observe the lane discipline, such as by eliminating the tendency, using line-of-sight distance, for the follower to speed up and close the gap 106 to the leader while negotiating the curve.

The leader's path 104 may be determined in several ways. The path that the leader is following may be a set of GPS coordinates transmitted by the leader to the follower over a V2V or other wireless interface. However, the leader's path 104 can also be determined by the follower without input from the leader, such as by using cameras and image processing to periodically determine the leader's position. Based on such information, control logic in the follower 102 may be interested to determine any combination of the position of the leader 102 relative to itself in a) lateral orb) longitudinal directions, or c) the lateral position of the leader 103 with respect to the lane markings near the leader's wheels.

The follower 102 may be interested to determine its own position with respect to the lane markings near its own wheels. Such position can be detected by vision sensors located anywhere on the follower 102 that can see the lane markings 110 (or other indicia of a lane location) on the road ahead, behind, or to the side of the follower. This process of using sensors to continuously determine the position of an object which is in view of those sensors will be called sensor-based positional tracking.

Lane markings 110 may consist of painted solid or dashed lines on the road surface or any other physical or otherwise detectable feature that permits a measurement of lateral position on the road surface. Such features may include the edge of the pavement, jersey barriers, traffic cones, guard rails etc. When the need is extreme, such as when the road is covered with snow, lateral position can also be derived from the vehicles in adjacent lanes, either to avoid collision or to simply assume that their motion amounts to a partial definition of their lane. Another extreme example is deriving lateral position from tire tracks in the snow before the road has been cleared by a snowplow.

It should be understood that some components of the position of any given object (be it the leader 103 vehicle, lane markings 110 or any object of interest) may not be measurable, formally known as "observable", due to limitations of the sensors used, or characteristics of the objects sensed, or the sensor-object relative arrangement, or due to other signal processing concerns such as symmetry or aliasing, or occlusion or noise levels. In some cases, for example, when no expectations about the size of the imaged object are available, the depth of an object is difficult or impossible to observe from a single camera image, but the bearing to the object (related to position left or right) may be easily observable. A case where symmetry is important is the measurement of longitudinal features on a roadway. Such measurements are often substantially unchanged, formally known as "invariant", to movement of the sensor(s) along the direction of typical motion. Examples of longitudinal features include solid and dashed lane markings, guardrails, tire tracks, lines of traffic cones, road edges etc. As a consequence of such invariance, the position or motion of a camera (or perhaps other sensor) in the longitudinal direction—that is, along the travel lane itself—is not observable. Measurements may also exhibit aliasing because, for example, one dashed lane marking (or e.g. traffic cone) looks the same as another after moving one dash length along the road. In the case of longitudinal features, it is typically still possible to observe the position of the camera in the lateral direction in addition to its orientation relative to the lane markings. Indeed, the limited observability is not a difficult limitation for lateral control (e.g. steering) purposes because the longitudinal coordinate is typically not relevant to lane following.

In general, the follower 102 uses the sensor inputs to control its own position so that it attempts to remain in the same lane as the leader 103, observing the same lane discipline as the leader at all times. Nonetheless, there are several options for defining what the same lane discipline means, discussed below. While the follower 102 never operates without a leader 103 positioned substantially in front of it at all times, there are cases where both vehicles operate between lanes 120. Some cases are where there is a deliberate intent to change lanes, or to enter or leave entrance or exit ramps, or pull to the shoulder, or to avoid a collision.

It should be understood that the follower 102 does not merely "drive towards the leader 103 on the shortest path", but instead may execute any of several lateral control disciplines, and they may even be combined in various ways. In path mimicry, the follower should follow the very same path that the leader has traveled. Thus, the follower also strives to arrive at the same positions Pn, Pn+1, . . . , Pm behind the leader.

The leader 103 is driven by a human or, in other instances, can be a fully autonomous vehicle executing robust self driving algorithms (e.g., SAE Level 4 or 5 autonomy). There may be economic value in having the leader 103 be human-driven, and there is potential safety and functional value in having most or all of the electronics on the follower 102 duplicated on the leader. In one scenario, the leader 103 includes a full autonomy suite of sensors and reports what it is perceiving to the follower 102 autonomy system.

Whichever is in control of the leader 103, be it a human or a robust autonomous driver, the leader is always "proving" the path for the follower 102. Thus the follower 102 can be guaranteed to be operating in at least as safe a manner as the leader 103. This in turn reduces constraints on the follower 102, therefore permitting the autonomous follower to have less complex logic, but still obtain increased safety benefits from following the leader 103.

Figure 1E:
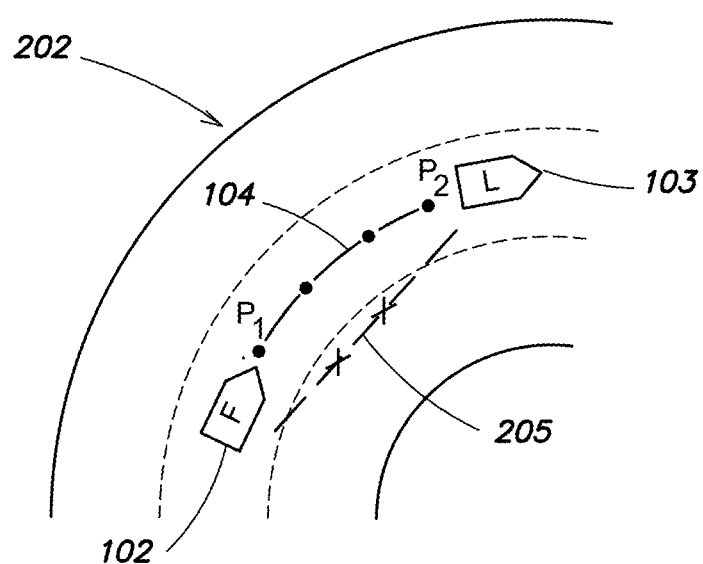

This is further understood with reference to a situation such as shown in FIG. 1D Here the leader 103 and follower 102 are traversing a path that includes a curve 202. If the follower 102 at position P1 were to simply "drive towards" the leader 103 at position P2, the follower might be apt to travel a path 205 that crosses from the center lane into the right lane (as it approaches the apex of the curve 202) as shown in FIG. 1E This situation is avoided by having the follower both "follow the leader's path 104" and also "observe the lane discipline" at the same time.

2. Lane Following

There are many places, such as in narrow road construction zones, weigh stations, or parking areas where the road surface lacks adequate lane markings. There are also situations such as when markings are worn or destroyed or when airborne or surface obscurants (weather/debris) are present where either the road surface lacks adequate lane markings or they are not adequately visible. In such cases, path mimicry is a useful lateral control discipline because it does not depend on the existence of any detectable road features of any kind—the path of the leader forms the reference from which the path of the follower is derived.

Most of the time, however, a lane following discipline may be more useful. In this discipline, the follower is granted a degree of autonomy to decide or control its lane center offset, even if it differs from that of the leader.

One motivation for such autonomy is the fact that human drivers tend to allow their vehicle to drift sideways somewhat in their lanes due to insufficient attention levels, whether caused by fatigue or distraction, or for other reasons. Furthermore, numerous momentary disturbances such as wind, lateral acceleration, slippery surfaces etc. may cause the leader to deviate from its lane center. In such cases, there is risk and usually no value in requiring the follower to mimic the precise lane center offset of the leader. One risk is the slight risk that an area that is clear for the leader may no longer be clear when the follower arrives at the same place. Another risk is the tendency for lane center offset errors to compound (string instability) when numerous followers follow each other.

All of these risks are mitigated if the follower 102 is granted "in-lane deviation authority"—the authority to move anywhere in its lane or, equivalently to deviate from the precise path of the leader, at least during routine operation, to some degree.

3. Lane Offset Mimicry and Temporary Deviations from the Path of the Leader

Nonetheless there are non-routine situations where it can be important for the follower 102 to more closely follow the path 104 of the leader 103. One case, that of inadequate lane markings, was discussed above. Another case is the case when there are lane markings 110 but the leader 103 is deliberately, and perhaps significantly, deviating from its lane center for a reason that suggests that the follower 102 should do the same maneuver at the same place. Here, because there are lane markings 110, we can define the desired lateral control discipline as "lane center offset mimicry". Such a discipline may allow the desired follower path to be defined more accurately, and usefully, in terms of mimicking the leader's lane center offset. Such definition is distinct from path mimicry which, rather, defines the follower path in terms of an estimate of the leader's path (derived from vision sensor measurements of relative pose and the follower's motion history).

Another consideration is that in general, human drivers tend to "drift" with respect to lane markings 110 constantly, and do not stay exactly within their lane. So, in that general case, it may not be ideal for the follower 102 to exactly mimic the lane behavior of the leader 103 at all times. It is better, in many cases, for the follower to stay within its lane 120 using the available lane markings 110 (or other indicia of where the travel lane is) while still observing safe following distance). However, when the leader 103 is deliberately and significantly deviating from its lane—such as during a lane change or to avoid an obstacle, the follower 102 should switch to mimicking the leader's movement.

The term obstacle is used here as it is often used in the art. An obstacle refers, not only to rigid objects, stationary or moving, that may impede motion. An obstacle additionally refers to any other hazardous condition (often called a hazard), occurring or potentially occurring at a position in space at a certain time which may represent a safety risk to the vehicle or to the people, or property nearby. For example, a leader or follower vehicle may take action to avoid encountering an "obstacle" which is a spot on the roadway which is a pothole, or is covered in debris or snow, or is suspected of being black ice, or is poorly understood by perception of humans or machines.

Turning attention to FIG. 1B, staying in the same lane 120 as the leader 103 may also involve having the follower 102 mimic a "lane center offset" 130 of the leader 103. Here the leader 103 travelling in the center lane 120-2 has drifted approximately by one-quarter lane into the left lane 120-1. The follower 102 may therefore detect or be told of this lane offset condition, and adjust its own lateral position to also travel to the left of the center lane 120-2 by one-quarter of a lane's width, thus "mimicking" the lane center offset 130 of the leader 103.

The key motivations for using lane offset mimicry are the potentially higher accuracy mentioned above as well as the fact that the follower's view of the road ahead is somewhat blocked by the leader itself. However, that is not to say that the follower 102 might not deviate from the leader's path 104 for short intervals.

The decision of whether to mimic the leader's lane offset 130 may be difficult sometimes. It is clearly worthwhile when the leader 103 is avoiding a stationary obstacle, and clearly not worthwhile when mimicking the leader will cause the follower to collide with a vehicle adjacent to itself. Here again it can be seen that it may be advantageous for the follower 102 to be granted a certain degree of autonomy as to whether to deviate or not from its lane center. In realizing such autonomy, two control decisions may include 1) how does the follower 102 know if the leader 103 is deviating deliberately or not (perhaps being blown by the wind or because the driver of the leader 103 is inattentive) and 2) even if it is known, should the follower 102 mimic or not. The follower 102 might, for example, have deviation authority that permits rejecting a momentary swerve maneuver of the leader ("maneuver reject" authority), or generating and executing its own maneuver to avoid an obstacle ("obstacle avoidance" authority).

As shown in FIG. 1C, in one situation the follower 102 may stay in the center lane even when the leader 103 reports (or is observed by the follower) to deviate temporarily. This might occur when an animal 140 is detected running across the expected path of the leader 103 (e.g., from right to left). This situation can also be detected for example by the follower 102 with its cameras or other vision sensors.

If the situation in FIG. 1C is detected by the leader 103, the leader 103 can report the temporary deviation caused by the presence of the animal 140 to the follower 102. Or perhaps the leader simply does not report its temporary position, Pt, in such a situation. The follower 102 can then determine it is safe to remain in its lane without deviation, because the animal 140 will have passed by the time the follower reaches that point. Or perhaps the follower 102 has maneuver reject authority and can determine that it is safest to continue to mimic the lane center offset of the leader 103, or to temporarily execute some other obstacle avoidance maneuver on its own.

4. Fusion of Lateral Control Disciplines

There are situations where it can be valuable to activate more than one lateral control discipline and to merge them in some manner. For example, in a case where a follower 102 is mimicking the path of the leader 103 in a construction zone, but there are jersey barriers or guard rails near the effective lane edges, it can be safer to allow the nominal path indicated by a travel lane (e.g. a guard rail) following to override the nominal path indicated by path mimicry, because the latter brings the follower too close to the physical barrier at the edge of the lane. In other words, the leader path 104 can be considered the "preferred path" but that can be overridden by a lane-derived path when safety requires it.

There are other ways to achieve the same result that may be more or less reliable. For example, if the follower 102 has obstacle avoidance deviation authority, it can exercise such authority and treat jersey barrier lane edges as (hard) obstacles instead of lane markings (suggestions).

It is also likely to be most reliable for the follower 102 to simply decide to switch to a different lane 110 following lateral control discipline in this case, as disclosed below. If such autonomous switching is permitted, a practical implementation may benefit from mechanisms for humans to intervene and/or mechanisms to impose preconditions on the switch.

5. Human Initiated, Automatic and Conditional Changes in Lateral Control Discipline There are situations where it may be useful for the follower 102 to decide to switch its lateral control discipline from one to another. If for example, the follower is mimicking 130 the leader path 104 but it discovers that lane markings 110 have been stable for a while, it can choose to start following lane markings 110. It may do so entirely on its own, or the follower 102 may choose to ask the leader 103 if the change is acceptable, or it may follow lane markings 110 only to the extent that a nominal path defined by the lane markings 110 does not deviate significantly from the leader path 104.

It is also likely that a decision process that switches disciplines will be more reliable if both new and old disciplines are activated for some period of time in order to make the transition smooth and reliable.

The human driver of the leader 103 may also at any time perceive an upcoming need for the follower 102 to transition to a different discipline and it would be useful to either tell the follower 102 to switch or to condition the follower to prepare to switch. An example is a case where a new construction zone, or an alteration to one, has just occurred and the follower may benefit from assistance in dealing with it.

6. Lane Offset Mimicry with Revoked Autonomy for Lane Change or Other Maneuvers

The discussion above has presented the situation where lane offset 130 mimicry may be valuable to help the follower 102 avoid an obstacle. It has also argued, at times, that the follower 102 may benefit from the freedom to exercise a degree of autonomy when its own situation differs from that of the leader.

Nonetheless, there are other situations when it may be safer for the follower 102 to have its deviation authority temporarily revoked. One clear case is the case where both vehicles are committed to execute a lane change maneuver. It may be a valid design decision to revoke deviation authority during the maneuver because the safety risk associated with leaving the follower alone in its lane (if the maneuver fails) is, in fact, higher than the safety risk of a poor decision to commit to the maneuver.

There are still other situations where revoked deviation authority is potentially useful. They include any situation involving operating outside the broader ODD (operational driving domain) for the follower 102 where deviation is typically allowed, whenever the lead driver decides to revoke it, and certain off-highway operations like stopping or starting the convoy from/to tandem or parallel parked configurations.

Note that deviation authority is defined relative to the nominal path of the follower 102—where it is more or less supposed to go before any follower-initiated deviations are introduced. The nominal path may include built-in intrinsic or leader-initiated deviations such as when the follower deliberately pulls to a stop beside the leader in a parking maneuver.

7. Imposing Follower-Derived Preconditions

There are also situations where safety is enhanced when the autonomy of the follower 102 extends even to the point of vetoing the intentions of the leader 103. One such case is a case where the follower 102 is fairly convinced that there is a risk of collision to its side that is evidently not known to the driver of the lead vehicle 103 who may be requesting, for example, the follower 102 to commence a lane change maneuver.

Another behavior that reduces demand on the autonomous follower 102 is for the follower 102 to stay directly behind the leader 103 even during a lane change. This can involve imposing constraints on the leader 102 such that it chooses a new lane that is the most likely to be safe and/or easy to navigate for the follower 102, or that it restricts the timing of the maneuver to those times most likely to be safe. Such lane following may be "string stable"—such that several followers in a row following each other do not cause the convoy to "wag" like a dog's tail.

Consider the situation shown in FIG. 2A. The follower is following the leader in the center lane. However, the leader 103 and/or follower 102 detect and/or report an interfering vehicle 180 (also designated with letter I) is located in an adjacent lane 120-3. Upon detecting this condition, the leader 103 will not attempt to change lanes to the right until the interfering vehicle 180 has passed by the convoy or has dropped behind. Or, the leader 103 may instead decide to change into the leftmost lane 120-1 in this situation.

In another situation, shown in FIG. 2B, the interfering vehicle 180 may still be some distance away from the convoy and thus the leader 103 and follower 102 still have space and time to execute a change to the right lane 120-3. However, the potential interfering vehicle 180 may be detected as closing in on the convoy at a rapid speed, such that the available space in the right lane 120-3 will no longer be available soon after the lane change. In this situation, the leader 103 may decide to wait and not execute the lane change until after the interfering vehicle 180 has passed the leader 103, even though space and time is sufficient.

FIG. 2C is yet another potential constraint on lane changes. Here the lane markings 110 to the right of the convoy are obscured. This may be a result of worn or missing markings, or weather conditions, or any state making it difficult for the follower to follow the leader while also observing lane marking constraints. In this case, as per FIG. 2D, after the leader 103 or follower 102 detects the fact that lane markings 110 are obscured, the leader 103 may choose to change lanes to the left 120-1 where the lane markings are clearer. Or the leader 103 may simply wait until the lane markings 110 are again clear before initiating any lane change maneuver.

In another scenario, the leader 103 and follower 102 begin as shown in FIG. 2E with a gap 106 between them. Potentially interfering vehicles 180-1 (I1) and/or 180-2 (I2) are present in an adjacent leftmost lane, with for example, vehicle I1 rapidly closing in on vehicle I2 in that same lane. As the leader 103 contemplates making a lane change, potentially interfering vehicle I1 is detected. The leader 103 and/or follower 102 take steps to temporarily reduce the gap 106 between them, at least enough to discourage the interfering vehicle I1 from attempting to enter the gap 106. The gap 106 may be reduced by the leader 103 decelerating while the follower 102 remains at speed. More generally, and for all adjustments of the gap between vehicles, the change can be accomplished by any combinations of acceleration and deceleration of individual vehicles that have the desired effect but these options may differ in terms of rapidity, feasibility, safety, fuel consumption, or other attributes. They may also differ in the resulting motion of the convoy as a whole, defined perhaps in terms of the motion of its center of mass or area etc. With this reduced gap 106 spacing, the leader 103 and follower 102 may then execute a lane change to the right as shown in FIG. 2F. Vehicle I1, who was motivated by closing rapidly on I2, is much more likely to simply use the now clear center lane 120-2 to effect its pass of I2.

8. Leader Handoff/Handover Strategies

This approach involves handing off (equivalently handing over) the autonomous follower 102 from one leader to another. There may or may not be human drivers in any of the vehicles involved. One use case of interest is where the autonomous follower switches from one leader to another while all three vehicles are "on the move."

Figure 3B:
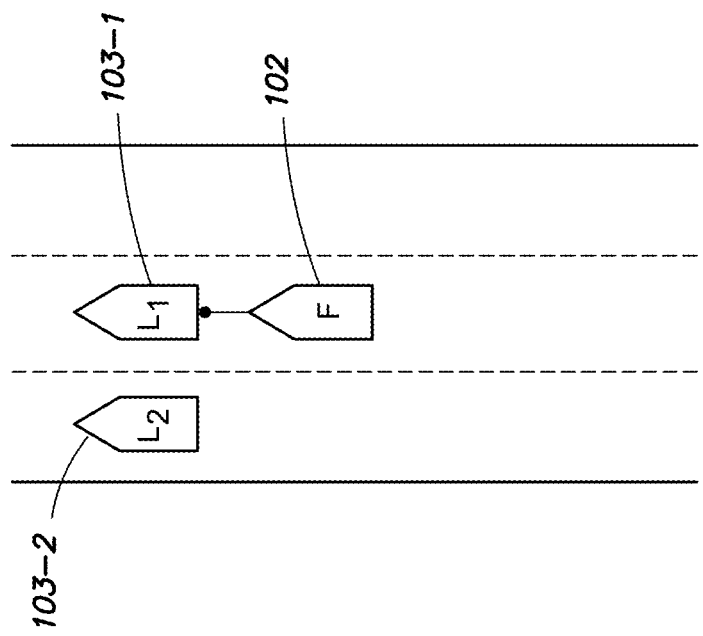
FIG. 3A to 3B illustrate a leader swap.
Figure 3A:
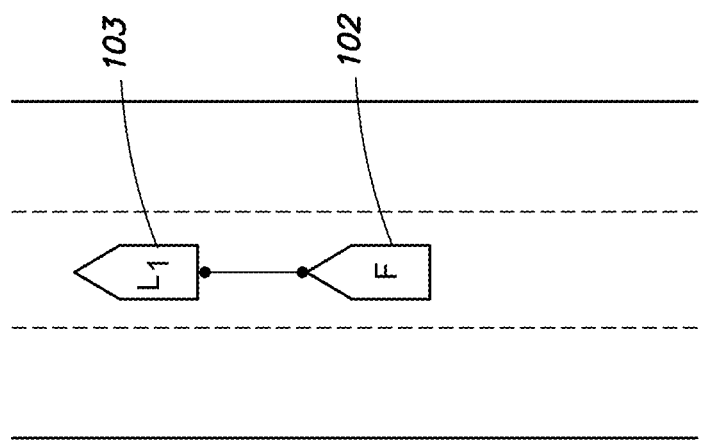

The handoff can proceed as shown in FIG. 3A. Here the follower 102 (F) is autonomously following a first leader 103-1 (leader-one or L1), using any known techniques. At some subsequent time, shown in FIG. 3B, another leader 103-2 (leader-two or L2) pulls up alongside the convoy in an adjacent lane. At this point the follower 102 is still following leader-one 103-1. After testing for preconditions (such as no blocking traffic or interfering vehicles or obscured lane markings etc.) the follower 102 switches from tracking leader-one 103-1 to tracking leader-two 103-2. At this point the convoy is now composed of the follower 102 and leader-two 103-2, with leader-one 103-1 having dropped out. See FIG. 3C. The follower then changes lanes to remain in the same lane behind leader-two, as shown in FIG. 3D.

Figures 3C, 3E:
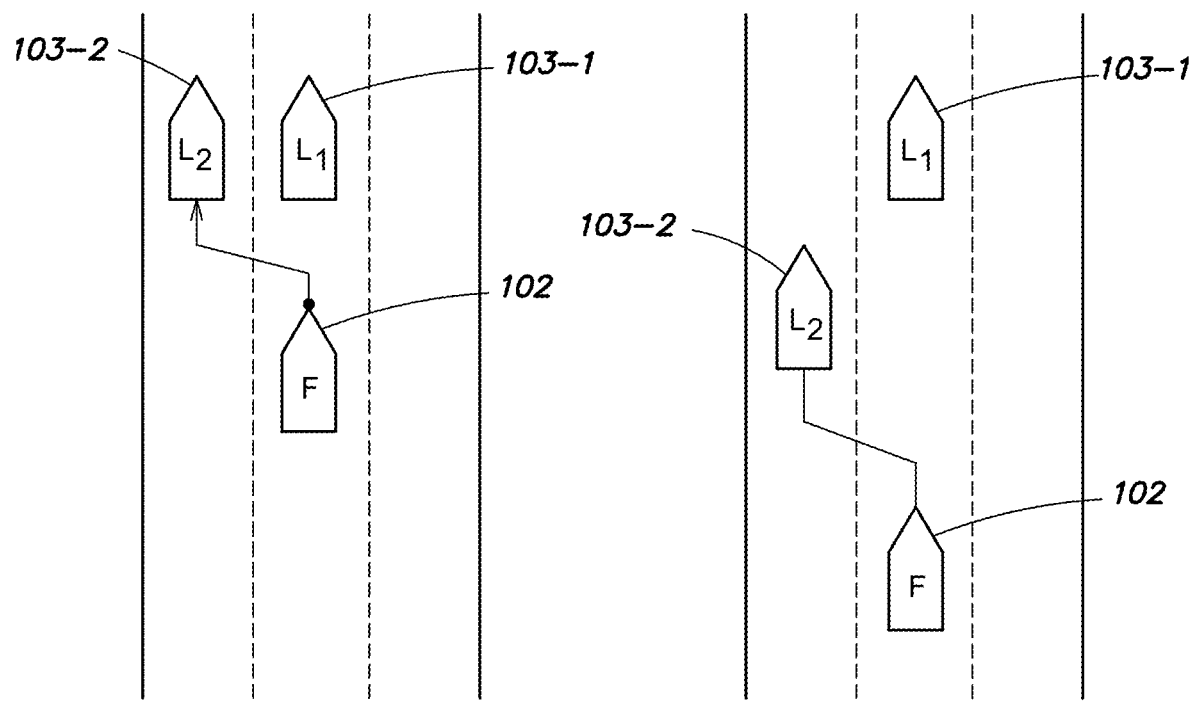
FIG. 3C to 3D illustrate another leader swap.
FIG. 3E to 3F illustrate yet another leader swap.
Figures 3D, 3F:
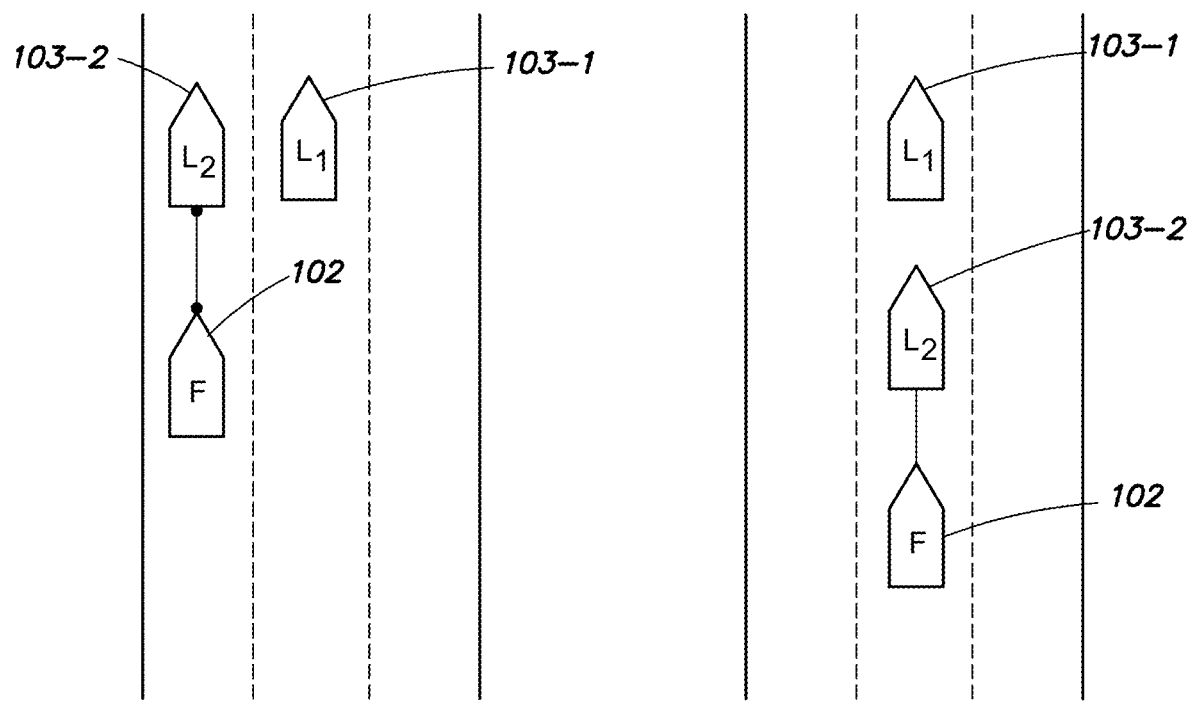

In another scenario, per FIG. 3E, the spacing between leader-one 103-1 and the follower 102 is increased before leader-two 103-2 takes over. This leaves enough room for leader-two 103-2 to enter the same lane as the other two vehicles, dropping in between leader-one 103-1 and the follower 102. The space can be created by having the follower 102 decelerate or leader-one 103-1 accelerate. What is important is that the separation is increased to make sufficient room for leader-two 103-2. Next, as shown in FIG. 3F, the follower 102 can immediately switch to following the path followed by leader-two 103-2. Leader-one 103-1 is then free of its responsibilities with respect to follower 102. Or, the follower 102 may switch to following leader-two 103-2 only when it, as expected during the leader-two 103-2 lane change, begins to block the view of leader-one.

In several of the leader swap maneuvers described above, the follower 102 may switch to following leader-two 103-2 when it is in another lane (into which the follower 102 is supposed to change) or when leader-two 103-2 is in the process of changing into the lane of the follower. In either case, it may be useful for the transition to the new leader to be executed more gradually such that the transition extends over a period of time or distance. A few strategies are possible to achieve this.

Regardless of which vehicle is changing lanes, the details of the lane change may proceed as follows. Once any preconditions to execute the leader swap maneuver are satisfied, the follower switches to "following" leader-two 103-2 in the sense that leader-two 103-2 is being visually tracked by the follower 102 and either leader-two 103-2 or the follower 102, or both, now has a goal of quickly moving laterally to position the follower behind its new leader. Note that once the switch takes place, the follower 102 is, at least initially, in a different lane or partially in a different lane than leader-two 103-2.

In one embodiment, the lateral control discipline that is in effect at the time for follower 102 will be allowed to function normally. It will notice a large lateral offset from the path of leader-two 103-2 and it will generate corrective trajectories that cause the follower 102 to converge onto the path of leader-two 103-2. In another embodiment, the desired path of the follower will be defined such that it is initially offset by one lane width (or the amount of the offset at the instant when the switch takes place) from that of leader-two 103-2 and this deliberate offset will be slowly reduced as time or distance travelled by the follower 102 naturally advances. In a third embodiment, the follower 102 is told to, or places itself, in lane following mode while leader-two 103-2 finishes the maneuver by moving laterally.

In either embodiment, the net effect will be for the follower 102 to gently become aligned behind leader 103-2. In the most general case, the follower 102 will move laterally toward the leader 103-2 while leader 103-2 simultaneously moves laterally toward follower 102. The follower 102 may or may not realize that it or that leader 103-2 is changing lanes and this may be the case regardless of whether the path of either vehicle is using longitudinal features to determine their positions with respect to lanes. What is important is that the two vehicles end up more or less aligned laterally in a short period of time.

Furthermore, in the case where leader-two 103-2 is controlled by a human driver, these strategies can all be designed so that they automatically adapt to variations in the lateral motion of leader 103-2 to achieve the desired goal configuration. This is the case because the lateral path following error is the difference between the desired and actual (lateral) positions and changing either—or both—will affect the error. In other words, whether leader 103-2 executes the intended motions or not, follower 102 can be configured to compensate in such a way to ensure that it ends up behind leader-two 102-3. The follower 102 can change lanes if the leader 103-2 fails to do so and the follower 102 can stay in its lane if leader-two 103-2 performs a lane change in a short period of time or distance. The follower 102 does not necessarily need to know how much lateral correction is intended to be the responsibility of each vehicle, and it does not need to know if either vehicle is changing lanes. One advantage of this approach is that it works even when there are no lanes, or no lane markings or no sufficiently detectable lane markings upon which to base the measurement of lateral positions.

This approach of permitting handover between leaders 103-1, 103-2 and followers 102 removes the requirement that a leader and follower follow the exact same travel route from start to finish. In other words, a sequence of leaders 103 can now cover a route desired by the follower 102, with multiple leaders taking turns in assuming the leader role while the follower remains on the move. This approach also removes the need to stop the convoy either on the shoulder or at a rest stop, in order to switch leaders. Most important of all, this approach allows leader swapping without ever leaving the follower 102 alone in its lane which would thereby require it to cope with arbitrary traffic situations.

9. Veto Override

In any of the above cases, it can be useful for a human driver to retain the final authority over any and all maneuvers. This can be important to force a follower 102 with failed or failing sensors to pull to the side of the road, for example. Another example is the case where the leader driver detects an obstacle (such as a hole) in the road and wants to force the follower 102 to avoid it. Such "negative obstacles" can be very difficult for autonomous vehicles to detect reliably.

10. Implementation Details and Options

Figure 4:
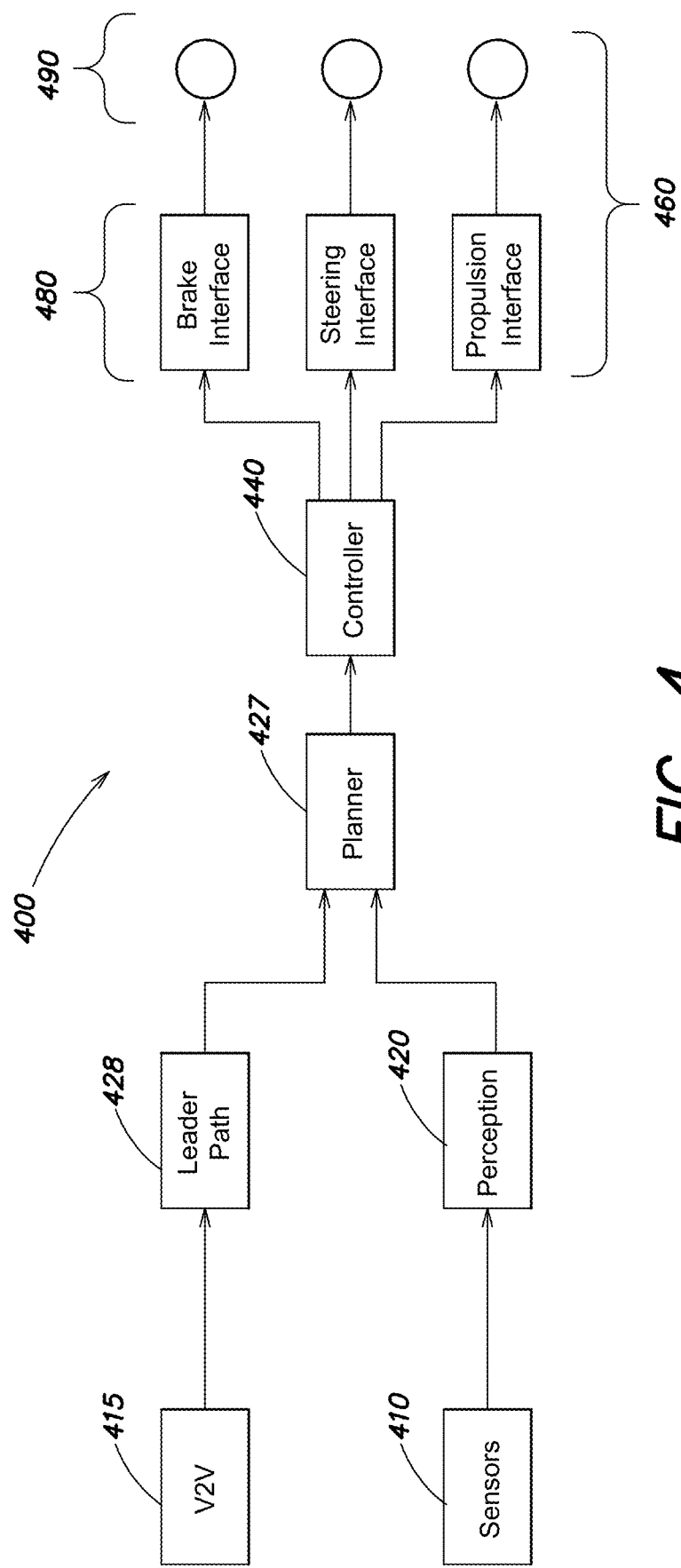
FIG. 4 is a block diagram of an electronics system that implements methods and apparatus described herein.

As was mentioned briefly above, FIG. 4 is an example schematic diagram of certain components of an autonomous vehicle, such as a semi-truck. The semi-truck can include a tractor and an associated trailer. Electronics 400 located in the tractor and/or trailer include one or more sensors 410, communications interfaces 415, controllers 440, and interfaces 480 to a drive system.

The sensors 410 can include vision sensors such as cameras, radars, sonars, or LIDARs, speed sensors such as odometers and gyroscopes, and other sensors. Some vision sensors will have fields of view that encompass a region in front of the autonomous truck, and other vision sensors may have fields of view that encompass side regions extending laterally from each side of the tractor or of a trailer coupled to the tractor. Still other sensors may point downward to view lane markings or other indications of the lateral extent of a road surface and/or the region that constitutes the intended lane of travel.

Other electronics in the autonomous follower may include one or more computers. The computer(s) process data received from the sensors 410, implement or use perception logic 420 to determine one or more conditions, and implement or execute planner logic 427 depending on those conditions. The planner logic 4270 in turn generates control signals that are fed to the controller logic 440. The controller logic 440 in turn generates control signals that are fed to interfaces 180 that operate the drive system include braking, steering, and propulsion interfaces.

Radio transceivers that transmit and receive data via wireless interfaces, such as a vehicle-to-vehicle (V2V) communication interface 415, may also provide data used in the planner 427 or control logic 440.

For example, a path 428 that the leader is following may be transmitted by the leader to the follower over the V2V interface 115.

The drive system 490 includes at least acceleration (or throttle), braking, and steering mechanisms that respond to electrical control signal inputs provided by the control logic 440.

As used herein, the computers can include a programmable data processing device corresponding to one or more processors, central processing units, graphics processing units, digital signal processors (DSPs), application-specific integrated circuits (ASICs), field-programmable gate arrays (FPGAs)), and/or custom designed hardware. In some configurations, methods performed by the computer(s) and/or the apparatus provided by the computers are instantiated via execution of software program code, e.g., execution of computer-readable instructions. These instructions can be stored in one or more memory resources of the computing device. The program code can include a program, a subroutine, a portion of a program, a software component and/or a specialized hardware component capable of performing one or more stated tasks or functions. A module or component can exist in memory or on a hardware component independently of other modules or components. Alternatively, a module or component can be a shared element or process of other modules, programs or machines.

The planner receives data from the sensors 410, the perception logic 420, and/or the V2V interface 415 to determine actions which are to be performed by the autonomous follower 102 in order for it to continue on the selected route to a destination.

As explained elsewhere in this document, the perception logic 420 and/or planner 427 may be uniquely configured based on a set of necessary sensors 410 and the desired constraints that permit the follower 102 to travel along the same path as the leader 103 while also observing lane markings, or to also mimic the leader's lane-center offset during lane changes, or during leader handover.

In some examples, sensor logic (not shown) can fuse the sensor data output by multiple sensors 410 before it is provided to the perception logic 420.

The perception logic 420 received inputs from the sensors 410 and performs functions such as object detection and classification, or leader path determination, and/or leader path prediction. Object detection and classification may use image processing to detect lane markings, or the presence of an interfering vehicle, or obstructions such as animals crossing the road. The leader's path may be transmitted from the leader to the follower, or determined by the perception logic, such as by comparing successive images of the rear of a leader vehicle and using 3D image processing techniques to derive a sequence of poses of the leader. Some example methods to determine and follow a leader's path are described in the co-pending U.S. patent application Ser. No. 17/071,156, filed Oct. 15, 2020, and entitled "VISION-BASED FOLLOW THE LEADER LATERAL CONTROLLER" which is hereby incorporated by reference.

The perception logic 420 can be specific in terms of identifying, for example, any one or more of a driving lane that the autonomous follower is using, its distance from an edge of a lane or edge of the road, and/or a distance of travel from a point of reference provided by the leader.

The perception logic 420 may generate a perception output that identifies information about moving objects, such as a classification of a moving object such as an interfering vehicle 180 or a second leader 130-2. The perception logic 420 may, for example, identify each of the classified objects of interest from the fused sensor view, such as dynamic objects in the environment, state information associated with individual objects (e.g., whether object is moving, a pose of object, or a direction of the object), and/or a predicted trajectory of each dynamic object.

The perception output can be processed by the controller 140 such as to generate an alert that causes a trajectory being followed by the follower to be altered.

Interfaces 480 enable control of the individual mechanical elements 490 of the drive system. These can include interfaces to electrically (or through programming) control a propulsion component (e.g., a gas pedal or electric motor torque control, a steering interface for a steering mechanism, a braking interface for braking subsystem, etc. The commands can include trajectory inputs (e.g., steer, propel, brake) and one or more other ways to specify an operational state of the autonomous truck (e.g., desired speed and pose, acceleration, etc.).

The control logic 440 may additionally receive inputs from motion sensors 110 (e.g. odometer for measuring speed or gyroscope for measuring turn rate). It may perform functions such as feedback control that monitor the difference between desired and measured motions and adjust the control signals fed to the drive system in order to remove any errors.

By way of example, the commands generated from the control system 440 can specify a relative or absolute position along a road segment at which the autonomous follower is to occupy at a certain time and while in motion (e.g., its lateral position with respect to the current lane, or the longitudinal gap from the leader). The commands can specify a speed, a change in acceleration (or deceleration) from braking or accelerating, a turning action, etc., The controllers translate the commands into control signals for a corresponding mechanical interface; control signals can take the form of analog or digital electrical signals which correlate to the magnitude, duration, frequency or pulse, or other electrical characteristics.

11. Example Behavior Flows

Figure 5A:
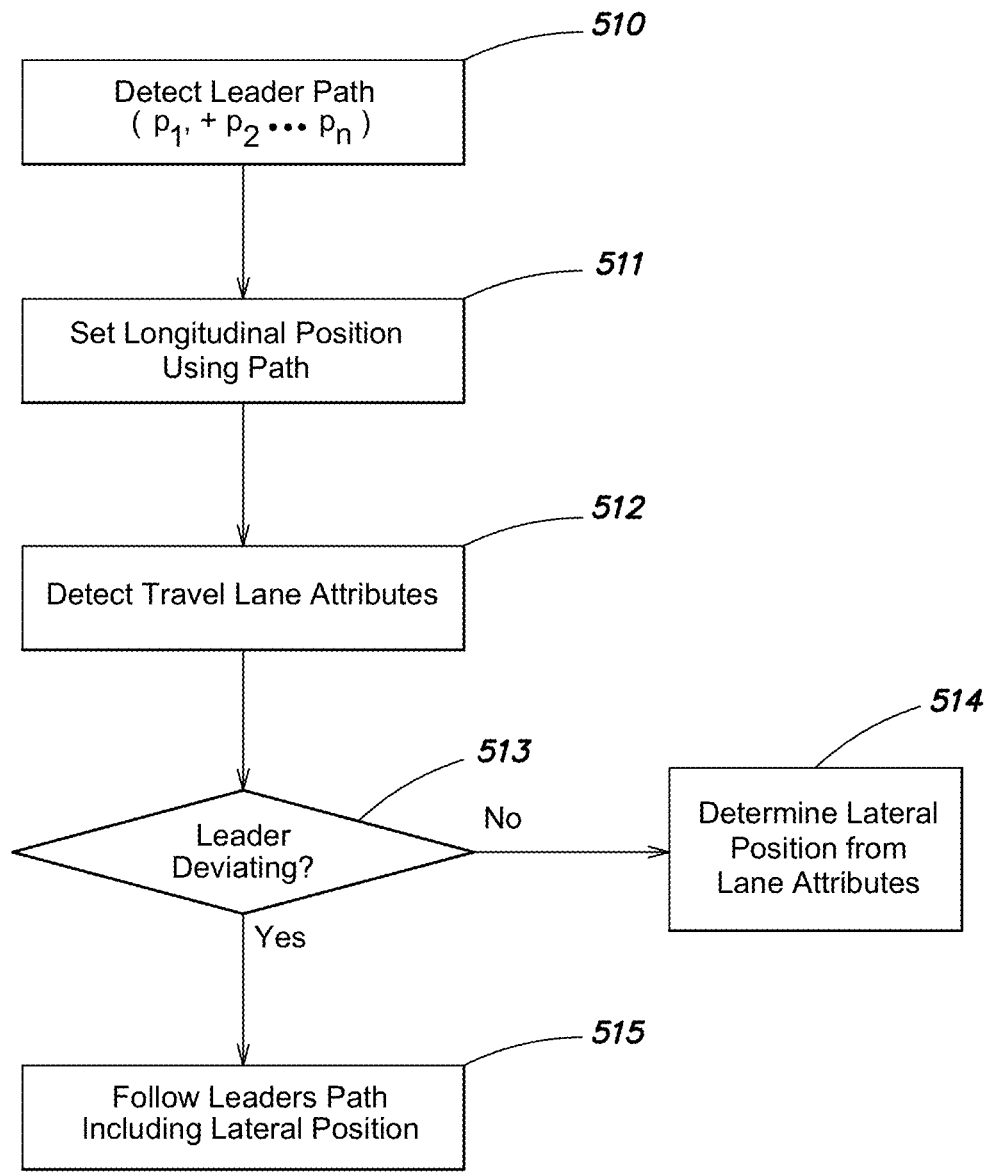
FIGS. 5A and 5B are an example flow for lane following behaviors.

FIG. 5A is one example of a flow that may be implemented by the planner 427 and/or controller 140. The follower first (at 510) determines a series of positions of the leader along a path (p1, p2, . . . , pn) in the manners described above, such as by using the sensors, or by being informed thereof via the communication interface. Next at 511, longitudinal positions of the follower are controlled such that the follower arrives at the same corresponding longitudinal positions along the path as the leader. In 512, sensors are also used to determine attributes of a travel lane.

A condition is then detected at 513, such as whether the leader is deviating from the path. If not, then at 514 the follower normally determines its lateral position using the detected travel lane attributes without regard to any detected lateral position of the leader along the path. However, if the follower either is informed of, or detects a condition that, the leader is deviating from its travel lane, then the follower at 515 exactly positions itself directly behind the leader such that the follower follows exactly the same path as the leader, including the same lateral position that the leader followed, until the condition is no longer present.

Figure 5B:
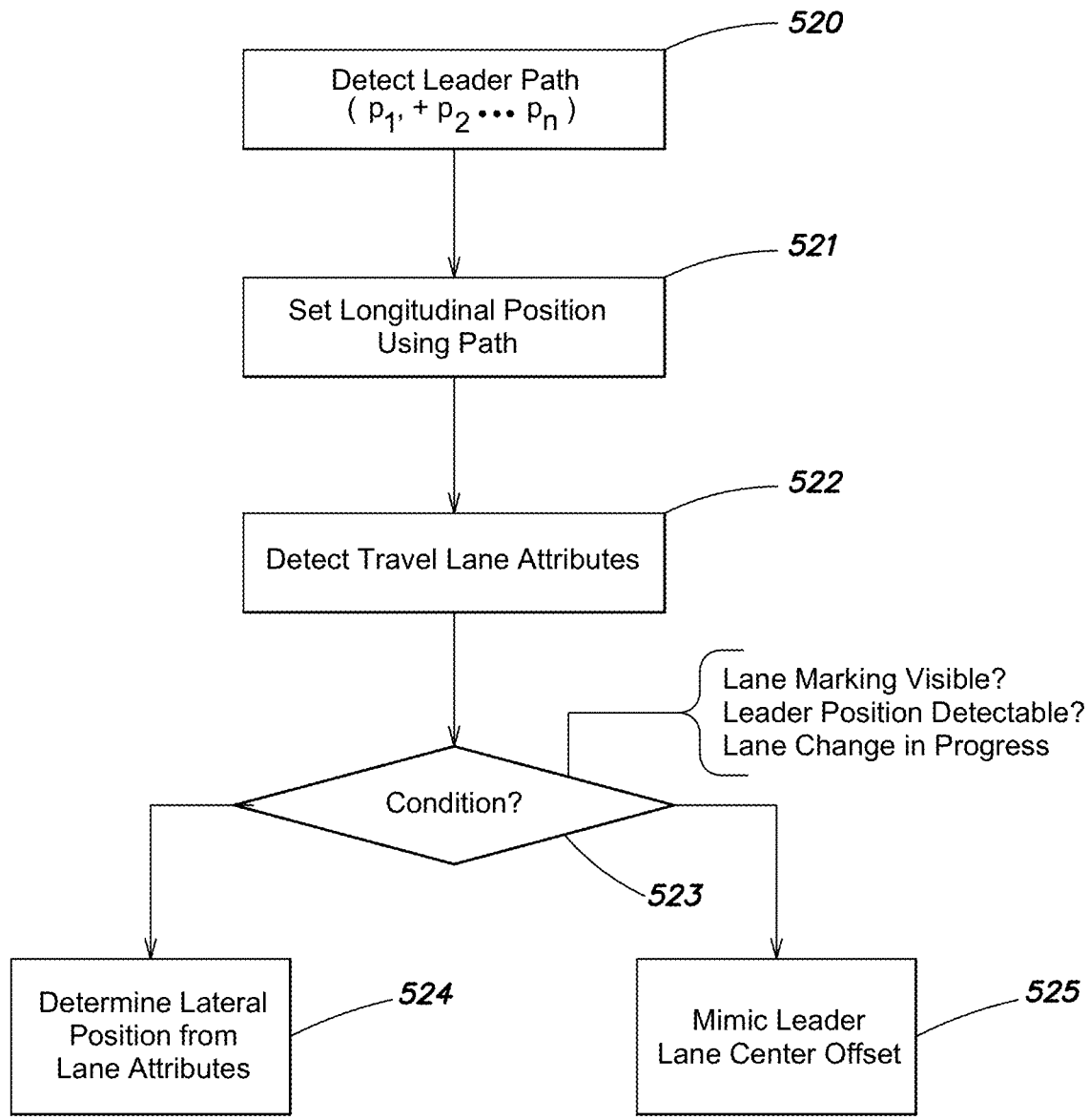

FIG. 5B is a similar but somewhat different possible flow. As with the case in FIG. 5A, the follower first determines 520 a series of positions of the leader along a path (p1, p2, . . . , pn) in the manners described above, such as by using the sensors, or by being informed thereof via the communication interface. Next, longitudinal positions of the follower are controlled at 521 such that the follower arrives at the same corresponding longitudinal positions along the path as the leader. Sensors are also used to determine or detect 522 attributes of a travel lane. A condition is then detected at 523—and depending on that condition, the follower further controls its own lateral position within that travel lane, either by using the detected lane attributes to determine an offset within the lane at 524, or by mimicking a lateral position of the leader within the lane at 525.

The conditions here may include whether lane markings are visible to the follower; whether the positions of the leader are detectable; or whether the leader is executing a lane change.

Figure 5C:
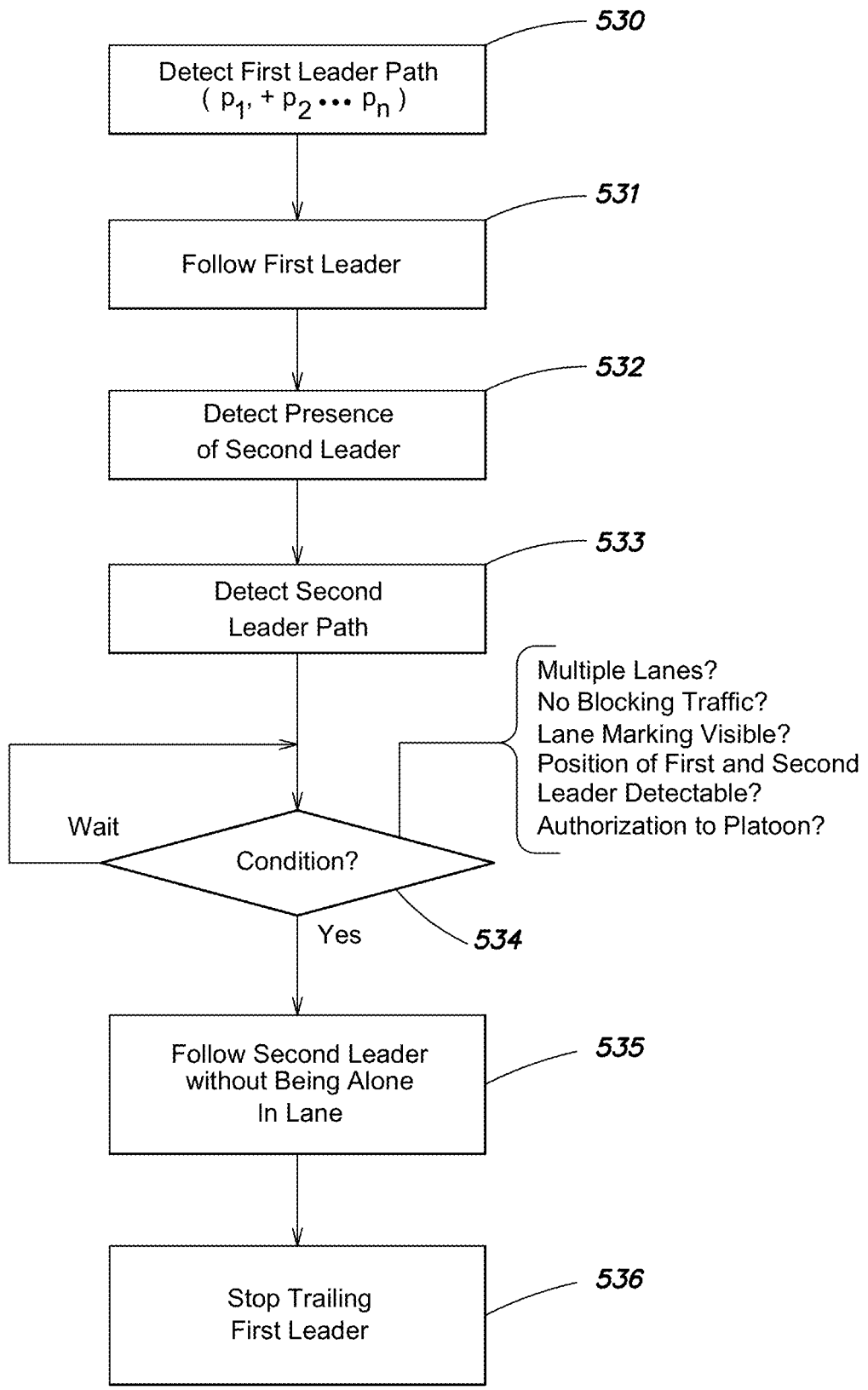
FIG. 5C is an example flow for leader swap behaviors.

FIG. 5C is a behavior flow that may be enabled during a leader swap maneuver. Here the vehicles involved include a first leader, a follower, and a second leader. Initially the follower detects or otherwise determines at 530 and follows at 531 the first leader's path (p1, p2, . . . , pn) via sensor-based positional tracking. Upon detection of a second leader at 532, the follower begins tracking that second leader's position at 533. The follower is subsequently enabled to follow the second leader instead of the first leader, but only when a precondition at 534 is first satisfied. When that precondition indicates the leader swap may proceed, the follower starts following the second leader's path autonomously via sensor-based positional tracking of the second leader at 535 and stops following the first leader's path at 536, in a way such that the follower is never alone in a travel lane without having either the first leader or the second leader to track.

The leader swap conditions may include any or all of: multiple available travel lanes for one or more of the first leader, the second leader, or the follower; no blocking traffic ahead; no interfering vehicles to sides; no traffic approaching from behind; lane markings visible to the follower's sensors; whether the follower is able to detect a position of either the first leader the second leader or both; an autonomy level of the follower; or authorization for the follower to platoon with the second leader

11. Behavior Management

In the art of autonomous vehicles, it is common to structure the design and the implementation of the autonomous systems into a hierarchy or other arrangement of "behaviors" which simultaneously pursue multiple goals that may, at times, be distinct, complementary, redundant, or even conflicting. One of many motivations for such structure is to manage the tradeoff of the time and computation required to predict the future and to deliberate on options, versus the hard real-time requirements of reacting to unexpected conditions as they occur.

In the case of the embodiments described herein, the system and methods may be arranged to endow the follower 102 with various autonomous behaviors with authority to, for example, generalize the concept of the leader's path 104, to deviate from the leader's path 104, or to restrict the leader's path 104.

In general, the concept of platooning is one where the motion of a leader vehicle 103 constitutes a "nominal" path for a follower 102 to mimic to some degree. The nominal path of the leader can be defined as its literal path or as the lane containing its path and it may be measured in a follower-relative or lane-relative manner.

A leader's "nominal" path (p1, p2, ..., pn) can be defined by either a) the leader's actual path on the road, b) the center-line of the leader's intended lane, or c) a time dependent deviation from the center-line of the leader's intended lane.

A leader's actual path can be measured either by the leader's GPS coordinates sent to follower, the leader-follower relative pose of the leader combined with follower motion history, or the lane center offset of the leader (as detected by the follower's sensors).

The follower may operate in a manner where it attempts to duplicate the leader's nominal path, as measured, or it may simply assume or be given authority to move independently in the same lane as the leader. Nonetheless, there are numerous reasons why the leader may expect or want the follower to deviate from the nominal path.

The follower's "nominal" path—that is, the path the follower should be following under routine conditions, can be defined as any leader nominal path possibly adjusted by specified deviations. The latter include deviations needed to carry out instructions like "park beside me" where the follower is supposed to not follow the leader or "stay in your lane" when the follower has transitioned to tracking a new leader that is about to pull in front of the follower.

Many of the autonomous behaviors of the follower may become active and inactive based on detected conditions, or on negotiated agreements while some may take precedence over others while still others may operate simultaneously. There are also reasons why the follower may expect or want or decide to deviate from its own nominal path. Such deviations are generated autonomously and unlike specified deviations are not specified by the leader or by some predefined maneuver.

Follower "desired" paths can be defined as any follower nominal path possibly adjusted by motions produced under prevailing deviation authority.

Leader and follower "actual" paths may be defined as the paths they drive "for real". They are different from desired paths because of disturbances and because control and estimation are imperfect.

Deviation authority may be any or all of "in-lane" under routine conditions, "maneuver reject" when the follower decides that the leader's lane offset is not important, relevant, or safe, or "collision avoidance" in any situation when avoiding collisions is needed or, as will be evident to one of skill in the art, it may be defined for any condition in which a designer deems it important for the follower to exercise a degree of authority to deviate from its nominal path.

Lateral control disciplines like path mimicry and lane following may not be totally mutually exclusive. In one design alternative, the follower vehicle will switch from lane following to path mimicry whenever it gets confused, or when it is told to do so, etc.

Because behaviors typically have memory, often called "state", the implementation of switches in behaviors will often require or benefit if both the old and the new behaviors are active for some period of time to render the transition smooth. For example, if switching from path mimicry to lane following, a transition period can be used to avoid a jump in the command to the steering actuator.

Changes in behavior activation may be initiated and enacted unilaterally under certain conditions where the system designers or human operators deem it to be the safest alternative or for other reasons.

It may be valuable for deviation authority of the follower to be revoked temporarily during a lane change maneuver (which includes all operations on, entering or exiting enter/exit ramps and road shoulders). This revocation may be performed to enforce a rule that the follower is never alone in its lane—which is a possible failure outcome of permitting deviation during a lane change.

Deviation authority may also need to be revoked in any situation where the follower is not competent to use it. Other examples include the follower operating outside its ODD (operational driving domain), whenever the lead driver decides to revoke it, or in off-highway operations.

Changes in behavior activation may be subject to the satisfaction of preconditions, including the execution of handshaking protocols. Changes in behavior activation may even be subject to vetos by another vehicle or a human.

Because revocation of deviation authority is itself a safety risk, the follower may need to have veto power over unnecessary maneuvers. In one alternative design, it can only veto before the maneuver is committed to.

In one alternative design where a human driver is present in the leader, the judgement of the human leader driver may have the highest priority. A human may need to be able to veto the veto (e.g. of a lane change maneuver), such as in the case where the follower is in a failure mode rendering it incompetent. Such a human override would permit the follower to be forced to cross the painted line defining the boundary of the shoulder and come to a stop on the shoulder.

12. Other Observations

The above description contains several example embodiments. It should be understood that while a particular feature may have been disclosed above with respect to only one of several embodiments, that particular feature may be combined with one or more other features of the other embodiments as may be desired and advantageous for any given or particular application. It is, of course, not possible to describe every conceivable combination of components or methodologies for purposes of describing the innovations herein, and one skill in the art may now, in light of the above description, recognize that many further combinations and permutations are possible. Also, to the extent that the terms "includes," and "including" and variants thereof are used in either the detailed description or the claims, these terms are intended to be inclusive in a manner similar to the term "comprising".

It also should be understood that the block and flow diagrams may include more or fewer elements, be arranged differently, or be represented differently. The computing devices, processors, controllers, firmware, software, routines, or instructions as described herein may also perform only certain selected actions and/or functions. Therefore, it will be appreciated that any such descriptions that designate one or more such components as providing only certain functions are merely for convenience.

While a series of steps has been described above with respect to the flow diagrams, the order of the steps may be modified in other implementations. In addition, the operations and steps may be performed by additional or other modules or entities, which may be combined or separated to form other modules or entities. For example, while a series of steps has been described with regard to certain figures, the order of the steps may be modified in other implementations consistent with the principles explained herein. Further, non-dependent steps may be performed in parallel. Further, disclosed implementations may not be limited to any specific combination of hardware.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Accordingly, the subject matter covered by this patent is intended to embrace all such alterations, modifications, equivalents, and variations that fall within the spirit and scope of the claims that follow.

The invention claimed is:

1. A system for operating a plurality of vehicles in a platoon, the vehicles including a leader and a follower, the system comprising one or more processors, memory, and one or more programs stored in the memory for execution by the one or more processors, the one or more programs including instructions that when executed by the one or more processors cause the system to:
   at the follower,
      detect a series of positions of the leader along a path (p1, p2, . . . , pn);
      control longitudinal positions of the follower such that the follower arrives at the same corresponding longitudinal positions along the path as the leader;
      detect attributes of a travel lane currently occupied by the follower;
      further control a lateral position of the follower with respect to the travel lane using the detected travel lane attributes without regard to any detected lateral position of the leader along the path unless the follower either is informed of, or detects a condition that, the leader is deviating from its respective travel lane, and if so, then,
         in accordance with determining the leader is deviating from its respective travel lane, position, by the follower, itself directly behind the leader such that the follower follows the same path as the leader, including the same lateral position that the leader followed, until the condition is no longer present.

2. The system of claim 1 wherein the one or more processors cause the system to:
   detect the series of positions of the leader using one or more sensors.

3. The system of claim 1 wherein the condition further comprises that the leader is avoiding an obstacle.

4. The system of claim 1 wherein the condition is a lane change condition.

5. The system of claim 4 wherein the one or more processors further cause the system to:
   at the follower,
      detect one or more lane change conditions that the lane change may not be safe to execute at the follower, and then
      either
      inform the leader that the follower is vetoing the lane change; or
      autonomously determine to not change lanes.

6. The system of claim 4 wherein the lane change condition includes one or more of:
   whether there are available travel lanes for either the follower, the leader, or both;
   whether there is blocking traffic ahead;
   whether interfering vehicles or other obstacles are located to a side of the follower, the leader, or both;
   whether traffic is from behind;
   whether lane markings are visible to the follower's sensors; or
   whether the follower's view of the leader is clear or obscured.

7. A system for operating a plurality of vehicles in a platoon, the vehicles including a leader and a follower, the system comprising one or more processors, memory, and one or more programs stored in the memory for execution by the one or more processors, the one or more programs including instructions that when executed by the one or more processors cause the system to:
   at the follower,
      detect a series of positions of the leader along a path (p1, p2, . . . , pn);
      control its own longitudinal positions so as to arrive at the same longitudinal positions along the path as the leader;
      detect one or more attributes of a travel lane; and
      control its own lateral position within that lane, wherein controlling its own lateral position within the lane comprises:
         in accordance with a first condition, using the detected lane attributes to determine an offset within the lane; and
         in accordance with a second condition, mimicking a lateral position of the leader within the lane.

8. The system of claim 7 wherein the series of positions represent where a reference point on the leader is relative to the road; and
   wherein the one or more processors cause the system to, when the follower reaches a corresponding longitudinal position, at the follower, further ensure a corresponding reference point of the follower is also in the same lateral position as the corresponding reference point of the leader when the leader was at the corresponding longitudinal position.

9. The system of claim 8 wherein the reference point is derived from a model of vehicle geometry of the first leader.

10. The system of claim 8 wherein the reference point is derived from a door to camera relative pose.

11. The system of claim 8 wherein the reference point is other than a point on the rear doors of the leader.

12. The system of claim 8 wherein the reference point is derived from a model of image formation of the leader.

13. The system of claim 8 wherein the reference point is adjusted for wheel slip.

14. The system of claim 7 wherein the follower controls its own longitudinal positions using leader-follower relative pose with adjustable pursuit distance.

15. The system of claim 7 the one or more processors further cause the system to:
decouple a control over distance to pursuit pose from a control over distance to leader.

16. The system of claim 7 wherein the first condition comprises any of lane markings being visible to the follower, the positions of the not leader being detectable, and the leader not executing a lane change; and wherein the second condition comprises any of lane markings not being visible to the follower, and the leader executing a lane change.

17. A method of operating a plurality of vehicles in a platoon, the vehicles including a first leader, a follower, and a second leader, the method comprising:
while the first leader is travelling along a first path:
autonomously following, by the follower, the first leader's path via sensor-based positional tracking of the first leader,
transitioning, by the follower, to following the second leader instead of the first leader, by the further steps of:
while the second leader is travelling within range of one or more of the follower's sensors,
testing, by the follower, for a precondition, and when the precondition is satisfied, stopping, following, by the follower, the first path of the first leader, and following, by the follower, a second path of the second leader path autonomously via sensor-based positional tracking of the second leader, such that the follower is never alone in a travel lane without having either the first leader or the second leader to track; and
detecting that the first leader moves away from the follower.

18. The method of claim 17 wherein the preconditions tested by the follower may include any or all of:
whether there are multiple available travel lanes for one or more of the first leader, the second leader, or the follower;
whether there is no blocking traffic ahead;
whether there are interfering vehicles to a side of any of the first leader, the second leader, and the follower;
whether there is traffic approaching from behind;
whether lane markings are visible to the follower's sensors;
whether the follower is able to detect a position of either the first leader, the second leader, or both;
an autonomy level of the follower; or
an authorization for the follower to platoon with the second leader.

19. The method of claim 17 additionally wherein transitioning to following the second leader further comprises:
when the follower is following the first leader in a travel lane, and the second leader is moving into an adjacent lane;
then
changing lanes, by the follower, to fall behind the second leader; and
initiating, by the follower, following of the second leader.

20. The method of claim 19 wherein the follower follows either the first leader, the second leader, or both by either detecting lane markings or by tracking the respective first leader or second leader.

21. The method of claim 17 additionally wherein:
when the follower is following the first leader in a travel lane;
the first leader and the follower moving longitudinally to create a gap between them, wherein the gap is sized such that the follower is still able to follow the first leader;
the second leader moving into the gap; and
the follower initiating following of the second leader and stopping following the first leader.

22. The method of claim 17 further comprising: informing, by the follower, the second leader that it is now following the second leader; and informing, by the follower, the first leader that it has stopped following the first leader.

23. The method of claim 17 further comprising: detecting, by the second leader, that the follower is now following the second leader; and detecting, by the first leader, that the follower is no longer following the first leader.

24. The method of claim 17 wherein the precondition is a sensed behavior of the first leader, the second leader, or both.

25. The method of claim 24 wherein the sensed behavior is a signal light.

26. The method of claim 17 wherein the precondition is receipt of information at the follower indicating that the follower should start following the second leader and stop following the first leader.

27. The method of claim 17 additionally comprising:
receiving, by one or more processors, leader state information as to which of the first leader and the second leader is currently leading the follower; and
comparing, by the one or more processors, the received leader state information and other leader state information derived from the follower's sensors; and
informing one or both of the first and second leader of any inconsistency in such state information.

28. The method of claim 17 additionally comprising:
determining a lateral offset from the path of the second leader; and generating a corrective trajectory for the follower that causes the follower to converge onto the path of the second leader.

29. The method of claim 17, additionally comprising: determining an offset to the path of the follower that depends on either a lane width or a relative position between the follower and the second leader, and wherein the offset is further reduced based on one or both of time or distance travelled by the follower.

30. The method of claim 17, additionally comprising: entering, by the follower, a lane following mode while the transition to following the second leader is in process.

* * * * *